Figure 1:
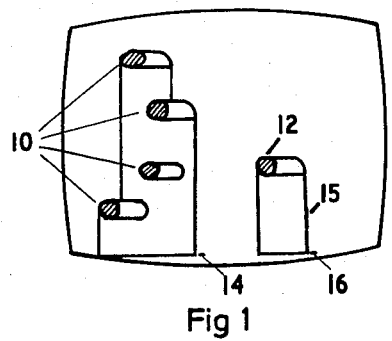

United States Patent [19]
Gibbons et al.

[11] 3,795,792
[45] Mar. 5, 1974

[54] FEATURE ASSOCIATION IN IMAGE ANALYSIS

[76] Inventors: John Michael Gibbons, The Grange; William Ralph Knowies, 40 Flambauls Cir., both of Meldreth, Royston, England

[22] Filed: May 8, 1972

[21] Appl. No.: 251,495

[30] Foreign Application Priority Data
May 6, 1971  Great Britain.................. 13590/71

[52] U.S. Cl. ......................................... 235/92 PC
[51] Int. Cl. ........................................ G06m 11/04
[58] Field of Search ... 178/6, 6.8, 7.1, 7.2, DIG. 37, 178/DIG. 36, DIG. 1; 235/92 DN, 92 PB, 92 PC

[56] References Cited
UNITED STATES PATENTS

| | | | |
|---|---|---|---|
| 2,891,722 | 6/1959 | Nuttall et al................. | 178/DIG. 36 |
| 3,020,033 | 2/1962 | McCreanor et al.......... | 178/DIG. 37 |
| 3,280,692 | 10/1966 | Milnes et al. ................. | 178/DIG. 1 |

Primary Examiner—Robert L. Griffin
Assistant Examiner—George G. Stellar
Attorney, Agent, or Firm—Oblon, Fisher, Spivak, McClelland & Maier

[57] ABSTRACT

Methods and apparatus are described by which detected signal pulses arising from features in a field can be associated to thereby generate so-called agglomerates of features, in dependence on the relative spacing of the features in the field. In this way it is possible to link up the detected signal pulse information relating to small features arranged approximately in straight lines.

The invention generates capture zones from each feature one extending in the line scan direction and the other generally perpendicular thereto.

The invention envisages the combination therewith of an associated parameter computer whereby information may be obtained relative to a parameter of each detected feature. The information from features within an agglomerate may be suppressed or collated and released as a single information signal relating to the agglomerate. Thus where a count pulse is generated for each feature these may be inhibited from all features within an agglomerate and the latter counted as a single feature. Alternatively where a signal proportional to the area of each feature is generated by the associated parameter computer, these may be combined for features within an agglomerate and a total area signal released for the agglomerate proportional to the total of the individual areas of the features within the agglomerate.

25 Claims, 12 Drawing Figures

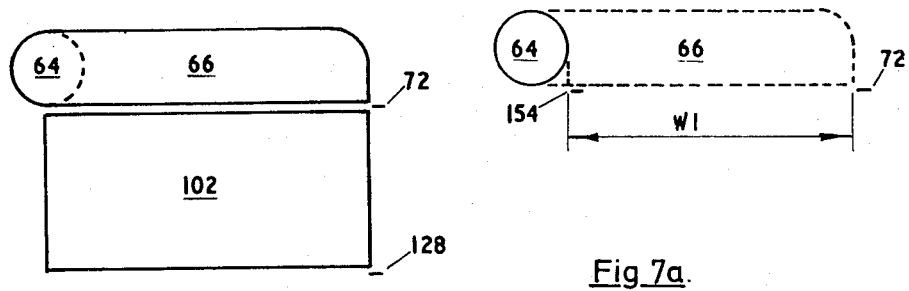
Fig 7a.
Fig 5a.
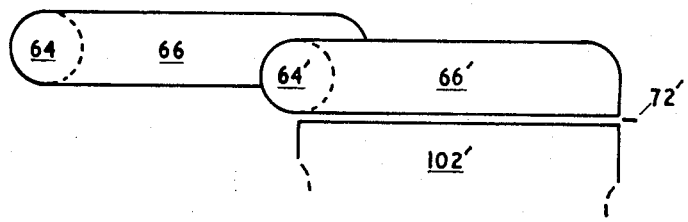
Fig 5b.
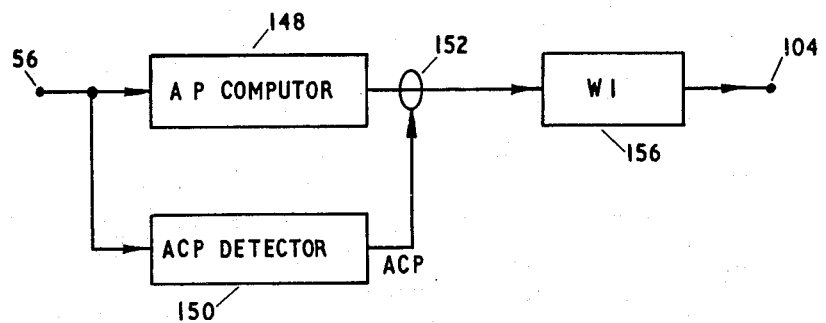
Fig 7.

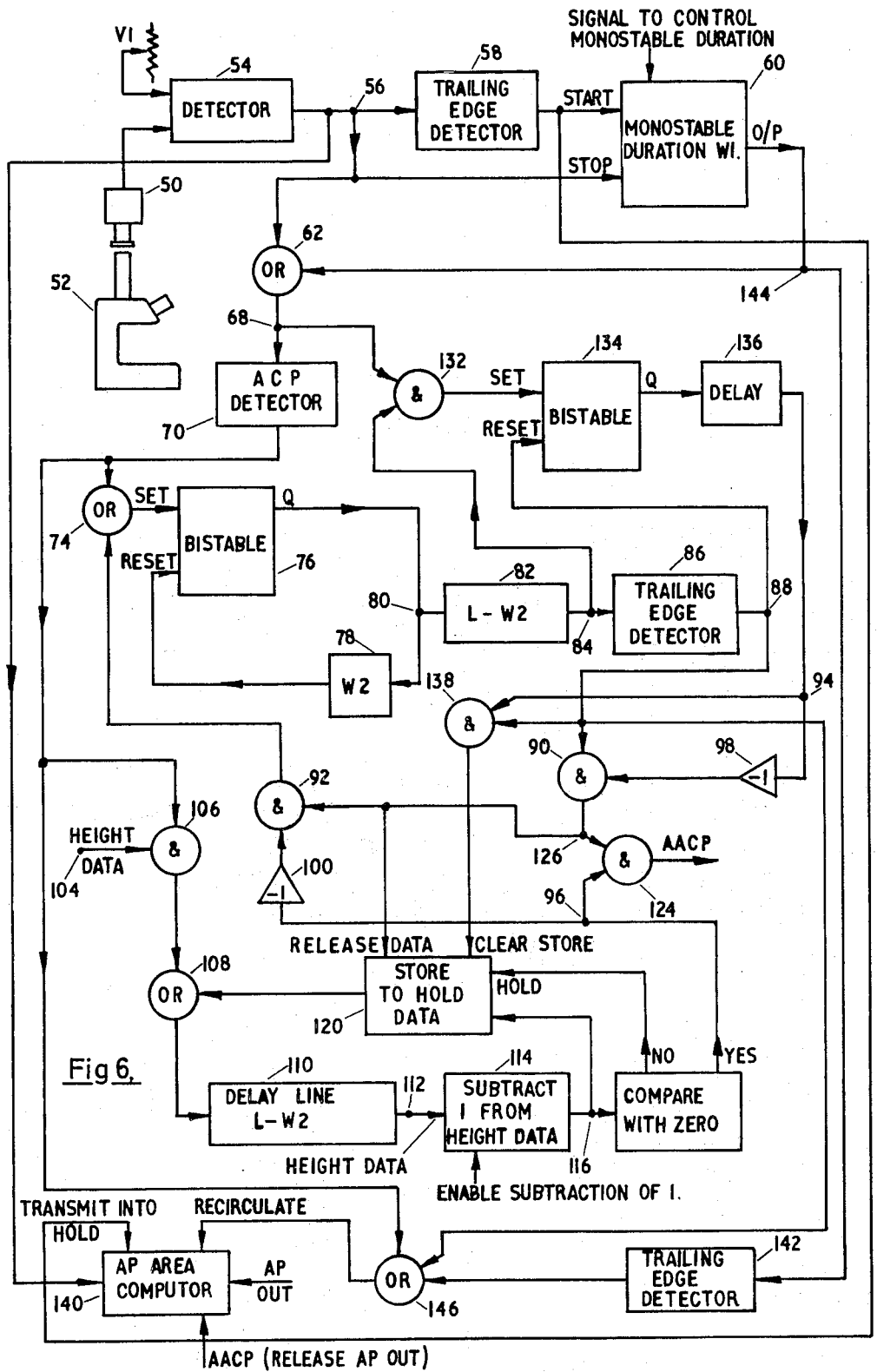

FEATURE ASSOCIATION IN IMAGE ANALYSIS

This invention concerns methods and apparatus for analysing features in a field in which a video signal thereof is generated by line scanning the amplitude excursions relating to feature content are detected by comparison with one or more reference voltages and measurements are made on the detected signal pulses. In particular the invention concerns a method and apparatus by which information relating to features and obtained by an associated parameter computer of the type described in U.S. Pat. No. 3,619,494 is not released at the end of scanning a feature if another feature is detected as being within a given proximity of the first feature, but is witheld and released for the agglomerate i.e., set, of features as a single associated parameter therefor.

The information signal may for example be a count pulse and it may be desirable to inhibit the count pulse for each of a set of features all within a given distance from each other and to release only that for the last feature in the agglomerate. The action of associating features in dependence on their proximity will be referred to as "agglomeration" and a set of such features is termed an "agglomerate."

Line scan information of a feature may be linked with that of another feature by stretching the detected signal pulses from the first feature in a direction parallel to the line scan direction, by the time taken to scan the given distance. If their spacing is less than this distance, the detected signal pulses of the second feature will overlap with the stretched ones from the first and the two informations can be combined.

The present invention allows link up of information in a direction perpendicular to the line scan direction as well as parallel thereto.

According to the present invention, each line scan intersect pulse in a detected video signal is stretched by a predetermined amount to form a modified pulse, at least one signal relating to the last modified pulse for each feature is recirculated from line to line, coincidence between a modified pulse of one feature and that of an adjacent feature in the field is detected and a warning signal generated if coincidence occurs. Conveniently the warning signal uniquely identified information obtained from scanning each such feature.

Thus, for example, information may only be released for features in an agglomerate or only features not in an agglomerate or only one signal released after the last feature in an agglomerate has been scanned.

The information signal may for example represent the accumulation of all the information signals obtained from all the features in the agglomerate — e.g. their total area. The areas of the stretch regions may also be included.

Alternatively where the information signal for each feature is a count pulse each may be inhibited for each feature in an agglomerate and only one count pulse released for the agglomerate.

According to a preferred feature of the invention the signal relating to the last modified pulse is recirculated from line to line for a predetermined number of line scans only.

The stretched portions of detected signal pulses together with the recirculated signal relating to the last modified signal for each feature, define a capture zone, of which part is referred to as the stretch zone and the other is referred to as a box zone. The width and/or depth of the box zone may be made constant (i.e., independent of the size of any feature for which they are generated). Or alternatively the size of the box may be made dependent on a dimension such as the area, height or width of the feature.

Thus, for example, the said predetermined number of line scans may be determined from a parameter of the feature such as its length measured in a direction perpendicular to the line scan direction, so that the "height" of the capture zone is made dependent on the feature "height."

The recirculation of the signal defining the box zone may occur at precisely one line scan period intervals, in which case the capture zone generated by the recirculating pulses will have sides which are perpendicular to the line scan direction.

If, however, the recirculation period is made less than or greater than one line scan period, the sides of the capture zone will be inclined to the line scan direction.

Preferably means are provided for inhibiting the recirculation of the signal defining a box zone for one feature if that signal coincides with a detected signal pulse relating to another feature or a stretched portion of a detected signal pulse relating to another feature, so that only one box zone exists for one agglomerate at any instant.

Alternatively, where coincidence of the recirculating signal defining a box zone and the stretched portion of a detected signal pulse, is detected and it is not possible to slip the information in the associated parameter computer by a sufficient amount against the direction of line scan so as to follow the trailing edge of the stretch zone of the new capture zone, the trailing edge of the first box zone, (and thereby the information associated therewith) is caused to slip forward against the line scan direction by a controlled amount on each line scan, until the position of the trailing edge of the new capture zone is reached or until the stretch zone thereof terminates.

Figure 2:
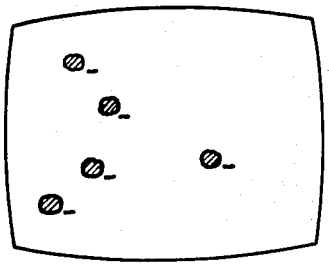
Figure 3:
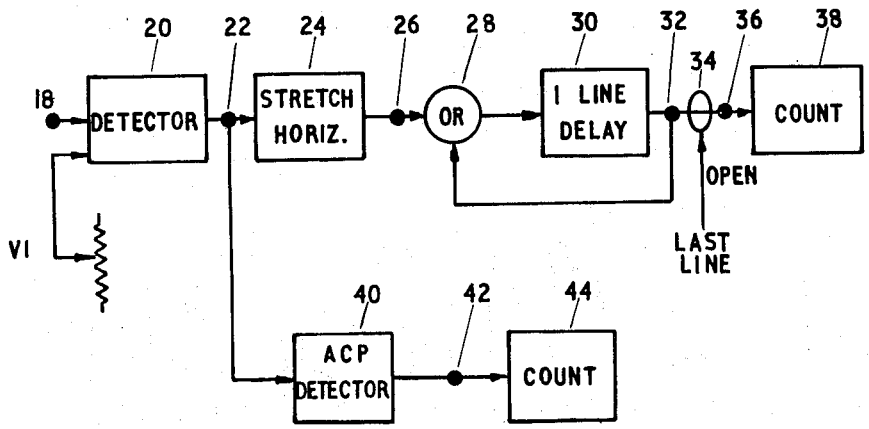
Figure 4:
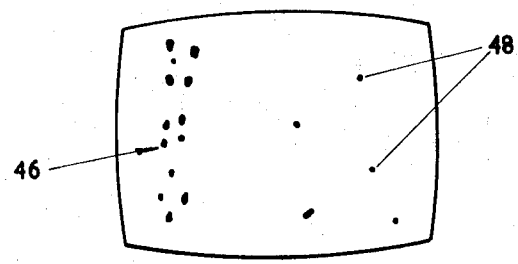
Figure 5:
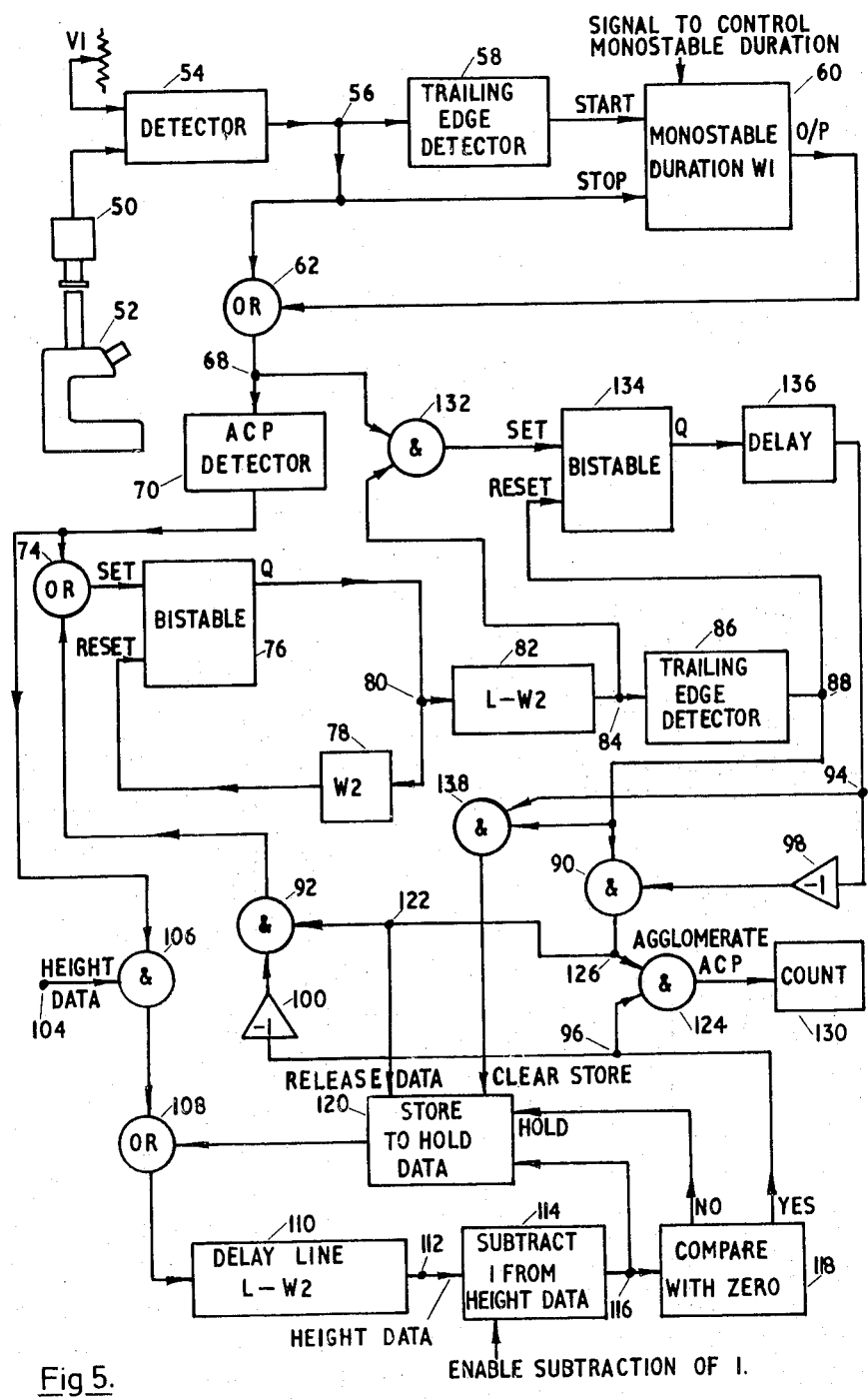

The invention will now be described by way of example with reference to the accompanying drawings, in which:

FIG. 1 illustrates a field containing an agglomerate which is counted as a single feature by a first embodiment of the invention, FIG. 2 illustrates separate feature counting, FIG. 3 is a block circuit diagram of a first embodiment of the invention, FIG. 4 illustrates non-metallic inclusions in steel, FIG. 5 is a block circuit diagram of a further embodiment, FIGS. 5a – 5d illustrate the capture zones generated by the circuit of FIG. 5, FIG. 6 is a block circuit diagram of a modification of the further embodiment of the invention, FIG. 7 is a block circuit diagram of an ancillary AP computer, and FIG. 7a illustrates the operation of the computer of FIG. 7.

In FIG. 1 features 10 are so close as to fall within the individual capture zones formed by the present invention, whilst feature 12 being isolated does not link up with any other feature in the field.

The features 10 form an agglomerate and only a single count pulse is produced for the agglomerate shown at 14. The usual count pulse 16 for the feature 12 is released at the end of its capture zone 15.

In FIG. 2, each feature is shown as being counted separately by producing a single count pulse at the end of scanning each feature.

In FIG. 3, an analogue video signal at 18 (e.g. from a television camera (not shown)) is supplied to a threshold detector 20 which produces a binary type detected signal having a 1-value when the video signal amplitude exceeds the detection threshold voltage V1 and a 0-value at other times. This detected signal appears at 22.

The 1-value pulses so obtained are sometimes referred to as line scan intersect pulses.

In order to provide a simple measure of their duration and also to enable the overall system to be synchronized, the intersect pulse signal at 22 is sampled at regular intervals and the 1- or 0- value obtaining at the sampling point is maintained for the remainder of the interval prior to the next sampling. The signal is then said to be clocked. The sampling points along each line scan are called picture points and the time taken to scan between 2 adjacent picture points is a picture point interval.

Each intersect pulse is stretched by the addition of a pulse of $n$ picture point intervals, by a stretch circuit 24, to produce modified pulses at 26.

The signal at 26 provides an input to a one line delay device 30 (which is preferably a shift register) via an OR gate 28. The other input for the gate 28 is derived from point 32 at the output of the delay 30.

The signal at 32 is prevented from passing to point 36 by gate 34 which is only opened during the last line scan in the frame. Counter 38 generates a single count pulse from each modified pulse from point 32 during this last line scan and counts each generated count pulse. The count pulses are conveniently generated by detecting the trailing edge of each modified pulse by a differentiating and rectifying circuit as employed in the counter described in U.S. Pat. No. 3,619,494.

A separate counter is provided for counting every feature as in FIG. 2. To this end the signals at 22 are supplied to a circuit 40 for detecting the last intersect pulse for each feature (i.e., an ACP counter) and generating a single count pulse for each feature at the anti-coincidence point (ACP) for the feature. These pulses appear at junction 42 and are counted by counter 44 set to count all such pulses during a single frame scan. One form of ACP counter is described in U.S. Pat. No. 3,614,494.

The invention is primarily applicable to the assessment of non-metallic inclusions in a steel sample, where the video signal is obtained from a television camera which views the polished steel sample through a microscope. Suitable choice of threshold voltage allows a detected signal to be produced in which the pulses only relate to oxide inclusions.

Some types of oxide inclusion are distributed randomly over the metal surface area. Other types occupy narrow zones running parallel to the rolling direction employed in the manufacture of the steel. This rolling action breaks up a large oxide inclusion into a number of small inclusions which are separated and spread along the rolling direction. Such a group of oxides is known as a stringer and one is shown at 46 in FIG. 4. Other isolated inclusions, not forming a stringer are shown at 48.

By counting all the detectable oxide regions (i.e., disregarding whether they are contained in stringers or otherwise) a total inclusion count is obtained and a comparison of the total oxide count and the number of oxide regions when account is taken of the stringers (i.e., the inclusions within a stringer are all counted as one) gives a measure of the proportion of features that are within stringers.

FIG. 5 is a block circuit diagram of a further embodiment of the invention in which provision is made for adjusting the size of the capture zones. A first size adjustment is provided by an adjustable stretch producing circuit and a second size adjustment is provided by a control over the number of times the signal is recirculated to generate a box zone beneath a stretch zone of the capture area.

A video signal is generated by a television camera 50 coupled to a light microscope 52 and video signal amplitude excursions relating to desired feature content are isolated from the remainder of the video signal by a detector 54 in which the video signal amplitude excursions are compared with a reference voltage V1 and detected signal pulses are generated for the duration of each excursion which exceeds the reference voltage. A trailing edge detector 58 generates a start signal for a monostable device 60 from the trailing edge of each detected signal pulse. A reset or stop signal for the monostable device 60 is also obtained from junction 56 direct. Thus, at the beginning of a detected signal pulse, the monostable 60 is reset irrespective of its initial condition and is restarted as soon as the trailing edge of the pulse is detected.

The output from the monostable 60 is applied to one input of OR-gate 62 the other input being derived from junction 56. The output from OR-gate 62 therefore comprises detected signal pulses each of which is stretched by W1. The output from OR-gate 62 thereby defines the original feature 64 (see FIG. 5a) of which the trailing edge is shown in dotted outline together with a stretch zone 66 formed by the monostable output pulses attached to the trailing edge of each detected signal pulse from junction 56. The detected signal pulses which therefore appear at junction 68 are referred to as modified pulses and can be thought of as relating to a feature formed by the two regions 64 and 66.

The anti-coincidence point for the feature so defined is detected by an ACP detector 70 of the type described in U.S. Pat. No. 3,619,494 in which junction 10 corresponds to junction 68 in FIG. 5 hereof. The ACP is illustrated in FIG. 5a at 72 and the signal generated at point 72 is supplied via OR-gate 74 to set a bistable device 76. The set output signal from bistable 76 is supplied to junction 80 and this signal is delayed by a delay device 78 by a time interval W2 ro provide a reset signal for bistable 76 a time interval W2 after the bistable device 76 is set. The pulses at junction 80 are applied to a delay device 82 of delay equal to L minus W2 where L is equal to one line scan period. The leading edge of each delayed signal thus appears a time interval W2 in advance of the position of the ACP 72 (in FIG. 5a) on the next line scan and the trailing edge of the delayed pulse at 84 thus coincides (on the next line scan) with the position of the ACP 72. This trailing edge is detected by trailing edge detector 86 and the short signal indicating the end of a pulse appears at junction 88 and is applied via gates 90 and 92 as a second input to OR-gate 74 thereby setting bistable 76 at the same point on the next line scan as it was set by the ACP at 72 on the previous line scan. So far it is assumed that zero signal obtained at junctions 94 and 96 so that an enabling signal is provided at the outputs of amplifiers 98 and 100 respectively thereby enabling gates 90 and 92.

The setting of bistable 76 on each successive line scan defines a box zone 102 (see FIG. 5a) the width of which (i.e. measured in the line scan direction) is determined by the duration W2 and the height thereof (i.e. measured perpendicular to the direction of line scan) is determined by a height data signal supplied from junction 104 as one input to an AND-gate 106 having the ACP signal from ACP detector 70 supplied to its other input. The height data from junction 104 is applied via OR-gate 108 to a delay line 110 having the same delay (L minus W2) as delay 82 so that the height data is available at junction 112 at the same time on the next line scan after the appearance of an ACP 72 as is the set signal for bistable 76. The height data at junction 112 is transferred to a subtraction stage 114 to which an enable signal is supplied after complete transfer of the height data, the action of 114 being to subtract one from the numerical height data supplied thereto. The reduced height data appears at junction 116 and this is compared in comparator 118 with a zero and a "no" signal generated if the reduced height information does not equal zero which serves as a hold signal for a store 120 to the input of which the reduced height data is supplied from junction 116.

The reduced height data stored in 120 is released therefrom by the appearance of a signal at junction 122 i.e. by the signal indicating the trailing edge of the pulse of duration W2 from junction 84 on that line scan. The reduced information from store 120 is applied via OR-gate 108 to the input of delay line 110 for recirculation and the process is continued until the reduced height data appearing at junction 116 equals zero at which time the "no" signal is not generated and instead a "yes" signal is generated which appears at junction 96. This provides an input for phase inverting amplifier 100 thereby removing the signal on the second input of gate 92 and inhibiting the circulation of the trailing edge signal from gate 90 to gate 74. This prevents bistable 76 being set and the box zone 102 is thereby discontinued.

A signal indicating the end of the box zone 102 is generated by an AND-gate 124 one input of which is supplied with signal from junction 96 and the other from junction 126 in the output of gate 90. Thus the trailing edge pulse from junction 88 which appears in the output of gate 90, when coincident with a "yes" signal from comparator 118, causes both inputs of gate 124 to be satisfied and a short duration pulse is generated known as the agglomerate ACP illustrated at 128 in FIG. 5a. A pulse counter 130 is set to count the agglomerate ACP signals such as 128 which are generated during a complete frame scan.

In the event that a second feature 64' lies within the stretch zone 66 of feature 64 (see FIG. 5b) the leading edge of each detected signal pulse from feature 64' causes the monostable 60 to be reset or stopped and the trailing edge thereof causes it to be restarted so that a fresh stretch zone 66' is generated from the trailing edge of feature 64'. No ACP is produced from the original stretch zone 66 since the stretched pulse which would have produced the ACP from feature 64 and stretch region 66 is merged with the detected signal pulse arising from scanning feature 64' on the same line scan and a fresh ACP 72' is detected for the new stretch zone 66'. A box zone 102' is generated therefrom in the same manner as described hereinbefore.

Figure 5C:
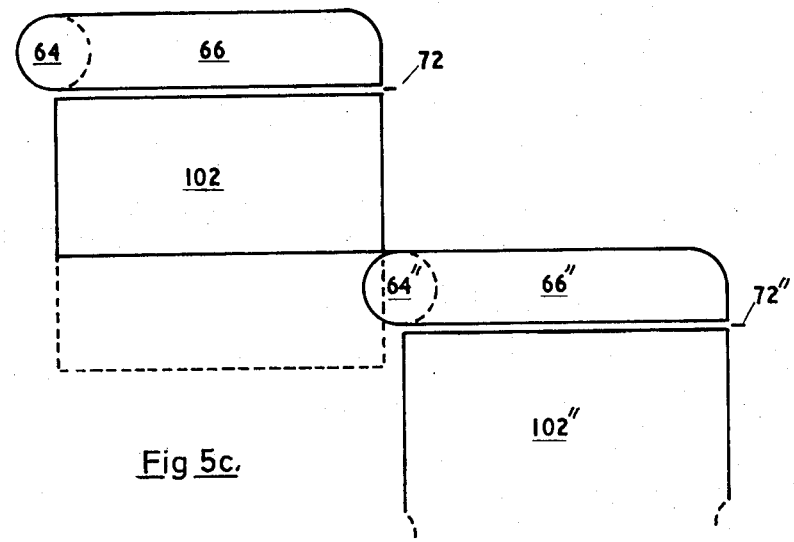

Referring now to FIG. 5c, if a box zone 102 intersects a second feature 64", a detected signal pulse will appear at junction 56 and therefore via OR-gate 62 at junction 68 sometime during the duration of a delayed pulse at junction 84. In this event both inputs of AND-gate 132 are satisfied and a set signal is provided for a further bistable device 134 the set output of which is delayed by a short delay device 136 (to prevent a so-called race) thereby producing a signal at junction 94 and causing gate 90 to be inhibited. The trailing edge signal for that pulse at junction 84 is therefore prevented from circulating via gates 90 and 92 to again set bistable 76 and box 102 is therefore stopped at that particular line scan. Coincidence of signal at junction 94 and the trailing edge signal at junction 88 satisfies both input condition for a further AND-gate 138 the output of which is arranged to clear any signal temporarily stored in store 120. This removes height data which is currently being recirculated for box 102 and thereby clears the count down circuit as far as box 102 is concerned.

In this way the box zone generating circuit and box height controlling circuit are both inhibited and the detected signal pulses relating to feature 64" together with the pulses in the output of monostable 60 relating thereto define a new stretch zone 66" for which a fresh box zone 102" is generated as before described. No agglomerate ACP signal pulse is generated with relation to box zone 102 and providing that box zone 102" does not intersect another feature, the agglomerate ACP signal pulse at the end of box 102" will appear as a single count pulse for the two features 64 and 64".

Figure 5D:
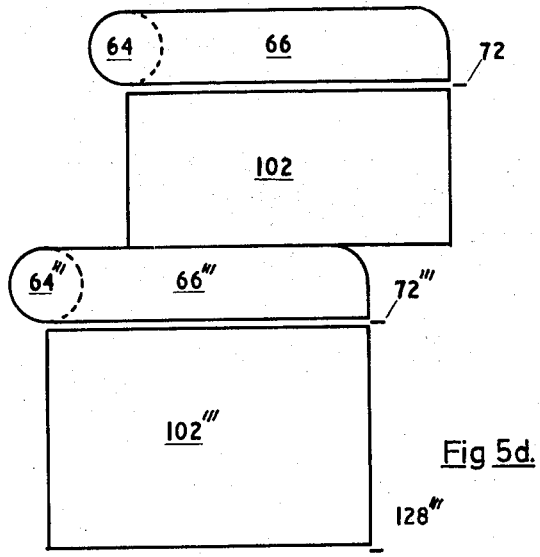

In FIG. 5d the alternative intersection condition is shown in which a stretch zone 66''' from a feature 64''' intersects the box zone 102 from feature 64. This condition is again detected by coincidence of signal at junction 68 and signal at junction 84 producing a set condition of bistable 134 which is delayed by delay 136 and causes an inhibit signal for gate 90 thereby preventing the continuation of box 102 as before described. The trailing edge signal at junction 88 provides the reset for bistable 134 and also serves to clear the height data stored in store 120 as before described so that the circuitry is ready to generate a new box zone 102''' after the ACP 72''' is detected for stretch zone 66'''. If new box zone 102''' does not intersect a further feature the signal appearing at ACP 128''' constitutes a single count pulse for the two features 64 and 64'''.

The total count in counter 130 at the end of a complete frame scan will equal the number of agglomerates detected. This count can be compared with that obtained using an ACP detector 40 and counter 44 as described with reference to FIG. 3 and supplied with the detected signal pulses from junction 56 of FIG. 5. The comparison of the two counts will indicate the proportion of features in agglomerate to those not in agglomerates.

FIG. 6 is based on FIG. 5 and to a large extent is identical thereto. To this end the same reference numerals have been used to describe similar parts thereof and only those parts which differ from FIG. 5 will be described.

The object of the modifications contained in FIG. 6 is to allow a signal to be generated corresponding to the total area of all features contained in an agglomerate and to allow this signal to be released as an associated parameter for the agglomerate. It is to be understood that although the parameter which is measured is the area of the features within the agglomerate, the same principle may be employed for any other parameter which can be obtained by measurements made on the detected signal pulses arising from scanning features in a field.

The area of each feature is measured by supplying the detected signal pulses from junction 56 as an input to an associated parameter computer 140 of the type described in our British Pat. Specification No. 1,264,805. Junction 56 of FIG. 6 corresponds to junction 10 of FIG. 2 of the drawings accompanying the aforementioned British Patent Specification.

The AP computer 140 comprises a first computing device (not shown) to which the detected signal pulses from junction 56 are supplied and which is adapted to generate for each detected signal pulse an electrical signal of magnitude corresponding to the duration of the pulse. Each such generated signal is supplied via an accumulator to a delay device for delaying electrical signals by a time interval equal to one line scan period. Signals are transmitted from the accumulator to the one line delay device only at the end of a stretch zone pulse (i.e., the trailing edge of the pulse produced by monostable 60 from that particular detected signal pulse or at the end of a pulse appearing at junction 84 i.e., at the end of a box zone pulse. The output from the delay device (not shown) is also supplied to the accumulator so that signals from the delay device (not shown) which arises during a detected signal pulse at junction 56 or during the stretch zone associated therewith are added to form a new value for circulation via the delay line to the next line scan. To this end a further trailing edge detector 142 is provided the input of which is supplied from junction 144 in the output of monostable 60 and the output of trailing edge detector 142 provides one input for an OR-gate 146 the other input of which is provided by the signals appearing in the output of trailing edge detector 86 at junction 88.

It will be seen with reference to FIG'S. 5a to 5d that no pulse is circulated on the line containing an ACP such as 72 and there will be no trailing edge detected by trailing edge detector 86 or 142 on the line scan intermediate the stretch zone 66 and box zone 102. In consequence no recirculate information would be applied to the AP computer 140 on the line scan containing an ACP and the information would be lost unless steps were taken to ensure that a recirculate command signal was also supplied to the AP computer 140 on the intermediate line scan containing the ACP 72. To this end the output from ACP detector 70 is also supplied to a third input or OR-gate 146 so that on the line scan immediately below the stretch zone 66 the information in the accumulator of the AP computer is transmitted into the delay device at the ACP 72. Where the AP computer 140 requires a signal indicating the end of each actual detected signal pulse the output from trailing edge detector 58 can be supplied thereto. This may be required in the event that the first computing device requires to be reset at the end of each detected signal pulse supplied thereto and a signal is required to transmit the pulse duration signal from the first computer means into the accumulator.

The signal from AND-gate 124 previously describes the agglomerate ACP constitutes a convenient gating signal to release the area information relating to all the features in an agglomerate at the ACP of the last box zone to be generated for the agglomerate. Consequently the agglomerate ACP signal is shown applied to AP computer 140 and this signal serves to release the information from the delay device (not shown) and inhibit the further recirculation of this information via the accumulator thereby clearing the computer store. The information which is gated out in this way constitutes the signal indicative of the total area of the features within the agglomerate and this is designated by the arrow AP out.

It will be seen that the information signal relating to the area of features so far agglomerated will always be available at the trailing edge of either a stretch zone or a box zone and since the increment of area information arising from the detected signal pulse of a feature will have been transmitted into the accumulator at the end of the detected signal pulse which will always occur prior to the end of the stretch zone pulse associated therewith, the value in the accumulator at the end of the stretch zone pulse will always be the correct value for circulation into the delay device.

By providing a delay device in the AP computer 140 which is less than one line scan period by a W2 (i.e., it corresponds to the delay device 82) the area information delayed from the previous line scan is always available at the beginning of the box zone 102 and is therefore available for transmission into the delay device prior to the end of the box zone in the event that a feature link-up occurs such as illustrated in FIG. 5d. To this end the output from the shortened delay device is supplied to the accumulator and is held therein until a recirculate signal is obtained from OR-gate 146.

FIG. 7 illustrates how separate height information may be obtained for each feature in the field depending on some parameter of the feature. To this end the detected signal pulses from junction 56 are supplied to a further AP computer 148 controlled by its own ACP detector 150 also supplied with the detected signal pulses from junction 56. The AP computer and ACP detector 148 and 150 respectively may be of the type described in British Pat. Specification No. 1,264,805 and the signal indicating the measured parameter for the feature is released by a gate 152 operated by the ACP pulse from the ACP detector 150 in the manner described in the aforementioned British Patent Specification. The position of the released information is shown at point 154 in FIG. 7a and it will be seen that this occurs time W1 in advance of the ACP for the stretch zone 66. Consequently the released information in FIG. 7 is delayed by a delay device 156 of delay equal to W1 (which equals the reset time for monostable 60) and the output from the delay device 156 is supplied to junction 104. In the event that an ACP signal appears at point 72 (i.e. the stretch zone 66 does not intersect any other feature) the ACP detector 70 provides a pulse at point 72 and the delay device 156 provides the height data signal at junction 104 and both input conditions for AND-gate 106 are satisfied. In the event that no ACP pulse appears at point 72 for feature 64 (i.e., stretch zone 66 has intersected another feature (not shown) in FIG. 7a) no ACP signal will appear at point 72 in the scan raster and the height date relating to the first feature in the agglomerate and appearing at junction 104 will not be passed by AND-gate 106.

The AP computer 148 may be set to measure the area of the feature and to release a signal proportional to the area so that the height information supplied to junction 104 increases with the area of the box zone for larger features. An inverting amplifier may be provided so as to reduce the size of the signal supplied to junction 104 for increasing area thereby producing smaller boxes for larger features. Alternatively the AP computer 148 may be set to measure the length dimension of the feature 64 (FIG. 7a) in a direction parallel to or perpendicular to the line scan direction or any other direction and the information supplied to junction 104 is made dependent on the value of the length dimension so measured. Alternatively the perimeter of the feature 64 may be measured and the height data supplied to junction 104 modified according to the perimeter of the feature last detected.

So far the width of the box zone (i.e., the length dimension of the box zone measured in a direction parallel to the direction of line scanning) has been assumed to remain constant and the box zone so generated therefore has parallel sides which are perpendicular to the line scan direction in view of the relationship between the delay device 82 and the duration of the pulses at junction 80. If however the delay device 82 is made a small fraction of a line scan period less than or greater than L minus W2, then the box zone will become a parallelogram having top and bottom edges parallel to the line scan direction but sides which are inclined to the line scan direction by an angle not equal to 90°. In the event that delay device 82 is made different from L minus W2 delay devices 110 and any delay device employed in AP computer 140 or AP computer 148 must be made equal to the delay introduced by the modified delay device 82.

A further modification may be made whereby the value of W2 may be made less during each successive line scan during which a box zone is generated and the delay introduced by delay device 82 increased or decreased by a corresponding amount so as to generate a box zone of trapezoidal or triangular shape. Any changes in the value of W2 and the delay introduced by delay device 82 during successive line scans of a box zone must of course be duplicated in delay device 110 and the delay device in AP computer 140 and 148 if employed.

Since the recirculating count value in delay device 110 is reduced by one for each line scan of a box zone, this recirculating signal may be employed or at least sensed and a signal generated from the sensing employed, to control the relationship between W2 and L minus W2. Thus by sensing the count value at the input of delay device 110 a reducing signal may be generated and control signals generated therefrom which select tappings in the delay devices 82 and 78 thereby altering the relative delays introduced by these two devices. If the total delay of 78 and 82 is maintained constant, the trapezium or triangle will have one height dimension which is perpendicular to the line scan direction but if the total delay of 78 and 82 is also altered and for example reduced on successive line scans, both sides of the trapezium or triangle will be inclined to the perpendicular to the line scan direction.

We claim:

1. A method of analysing features in a field in which a video signal thereof is generated by line scanning, amplitude excursions relating to features are detected by comparison with one or more reference voltages and measurements are made on the detected signal pulses, comprising the further steps of, stretching each detected signal pulse by a predetermined amount to generate signals for each feature defining a first capture zone, generating a control pulse upon detecting the end of each of said signals defining each first capture zone which does not coincide with a detected signal pulse from another feature, recirculating the control pulse from line to line to define a second capture zone which extends in a direction generally perpendicular to the direction of line scanning, and associating the detected signal pulses from which capture zones are generated and which coincide with capture zones, thereby, to form an agglomerate.

2. A method as set forth in claim 1 further comprising the step of terminating the control pulse defining the second capture zone on the last line scan of the scan raster.

3. The method as set forth in claim 1 further comprising the step of generating a cancel signal to terminate the control pulse defining a second capture zone if coincidence is detected between signals defining the second capture zone and detected signal pulses from another feature.

4. The method as set forth in claim 3 further comprising the step of cancelling the control pulse defining a second capture zone after it has been recirculated a predetermined number of times from line to line.

5. The method as set forth in claim 3 further comprising the step of recirculating the control signal at precisely one line scan period intervals.

6. The method as set forth in claim 3 further comprising the step of recirculating the control signal at intervals of less than one line scan period.

7. The method as set forth in claim 3 further comprising the step of recirculating the control signal at intervals of greater than one line scan period.

8. The method as set forth in claim 3 further comprising the step of making measurements on the detected signal pulses relating to each feature, generating an information signal for each feature, accumulating the information signals arising from features within an agglomerate and releasing the information signals by the output pulse generated upon detection of the end of the second capture zone of the last feature in the agglomerate.

9. The method as set forth in claim 8 further comprising the step of making each information signal a count pulse so that the accumulated information signal released at the end of an agglomerate constitutes the number of features within the agglomerate.

10. The method as set forth in claim 8 further comprising the step of combining with the information signal generated for each feature a signal proportional to the area of the feature whereby the accumulated information signal released at the end of an agglomerate constitutes a signal proportional to the total of the individual areas of features within the agglomerate.

11. The method as set forth in claim 8 further comprising the step of generating the information signal for each feature proportional to a length dimension of the feature.

12. The method as set forth in claim 3 further comprising the step of generating an output pulse upon detection of the end of a second capture zone if the signals defining the latter do not coincide with detected signal pulses relating to another feature.

13. The method as set forth in claim 12 further comprising the step of cancelling the control pulse defining a second capture zone after it has been recirculated a predetermined number of times from line to line.

14. The method as set forth in claim 13 further comprising the steps of making measurements on the detected signal pulses relating to each separate feature, generating an information signal from said measurements for each feature and releasing the information signal for a feature only if signals defining both first and second capture zones therefor are not coincident with a detected signal pulse from another feature.

15. The method as set forth in claim 14 further comprising the step of selecting the information signal proportional to a length dimension of the feature measured perpendicular to the direction of line scan.

16. The method as set forth in claim 14 further comprising the step of making the information signal proportional to a length dimension of the feature measured in a direction parallel to the line scan direction.

17. The method as set forth in claim 14 further comprising the step of utilizing the information signal for each feature as a count pulse.

18. The method as set forth in claim 17 further comprising the step of cancelling the control pulse defining a second capture zone after it has been recirculated a predetermined number of times from line to line.

19. The method as set forth in claim 18 further comprising the step of maintaining said predetermined number constant for all features in a field.

20. The method as set forth in claim 18 further comprising the steps of making the said predetermined number dependent on the value of the information signal generated for the feature.

21. The method as set forth in claim 20 further comprising the step of selecting the information signal proportional to the area of the feature.

22. Apparatus for analysing features in a field of which an image is scanned in a series of lines and a video signal is generated relating thereto, comprising: threshold detector means for detecting amplitude excursions of the video signal relating to features, first circuit means coupled to said threshold detector means for stretching each detected signal pulse by a predetermined amount to generate for each feature a first capture zone, second circuit means coupled to said threshold detector means for associating detected signal pulses defining a first capture zone with those of a feature whose detected signal pulses coincide therewith, third circuit means coupled to said threshold detector means for generating a control pulse at the end of a first capture zone, means coupled to said third circuit means for recirculating the control pulse from line to line to define a second capture zone which extends in a direction generally perpendicular to the direction of line scanning, fourth circuit means coupled to said third circuit means for detecting coincidence between a second capture zone signal and a detected signal pulse from another feature for associating detected signal pulses from the said other feature with those of the feature content generating the second capture zone.

23. Apparatus as set forth in claim 22 further comprising further circuit means for generating a cancel signal in the event that coincidence between a second capture zone signal and a detected signal pulse from another feature is detected and circuit means responsive to a cancel signal to terminate the recirculation of the control pulse generating the said second capture zone.

24. Apparatus as set forth in claim 23 further comprising circuit means for generating an output pulse at the end of a second capture zone if coincidence between a signal defining the latter and a detected signal pulse from another feature has not been detected.

25. Apparatus as set forth in claim 24 further comprising circuit means for terminating the recirculation of the control pulse after it has been recirculated a predetermined number of times from line to line.

* * * * *